May 16, 1933.    E. V. HILL    1,909,466
THERMAL UNIT SYSTEM
Filed April 21, 1932    3 Sheets-Sheet 1

Inventor
EARL VERNON HILL.
By Albert Grobstein
Attorney

May 16, 1933.  E. V. HILL  1,909,466
THERMAL UNIT SYSTEM
Filed April 21, 1932  3 Sheets-Sheet 2
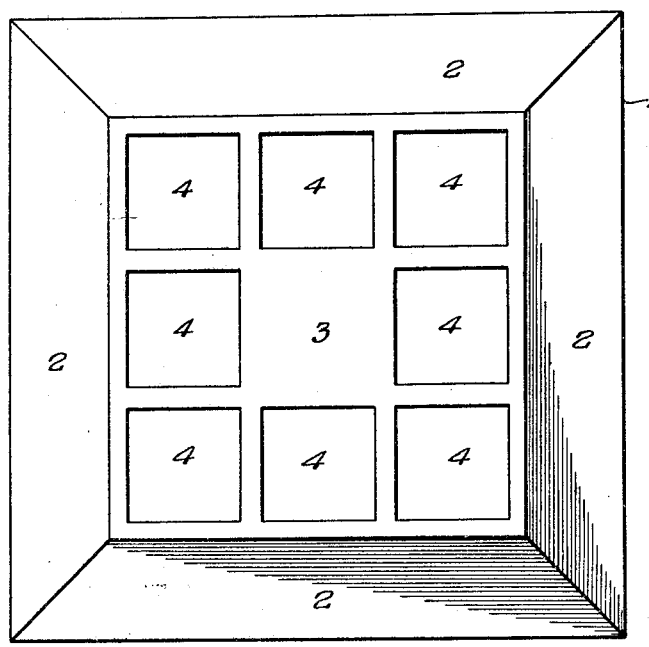
Fig. 2.
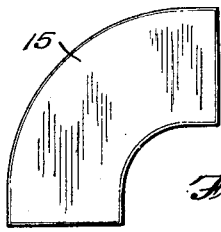
Fig. 3.
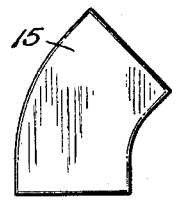
Fig. 4.
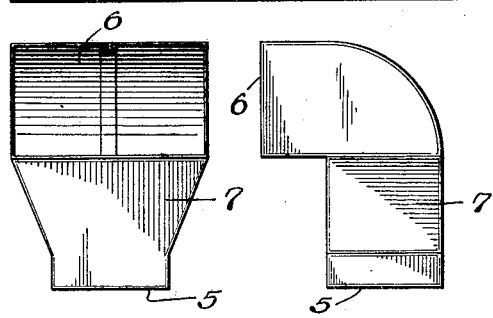
Fig. 5.  Fig. 6.
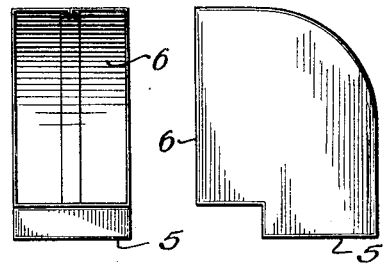
Fig. 7.  Fig. 8.
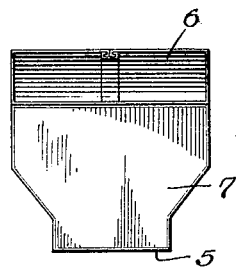 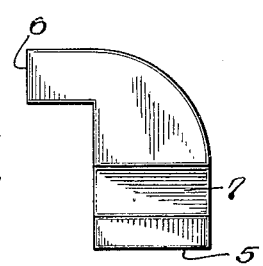 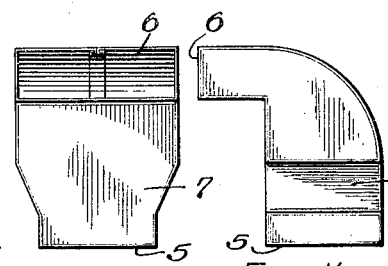
Fig. 9.  Fig. 10.  Fig. 11.  Fig. 12.
Inventor
EARL VERNON HILL.
By Albert Grobstein
Attorney May 16, 1933.  E. V. HILL  1,909,466

THERMAL UNIT SYSTEM

Filed April 21, 1932   3 Sheets-Sheet 3

Inventor
EARL VERNON HILL.

Albert Grobstein
Attorney

Patented May 16, 1933

1,909,466

UNITED STATES PATENT OFFICE

EARL VERNON HILL, OF CHICAGO, ILLINOIS

THERMAL UNIT SYSTEM

Application filed April 21, 1932. Serial No. 606,737.

This invention relates to a thermal unit air distribution system, and more particularly, to standardized square air distributing ducts associated with a hot air or other heating or cooling apparatus, or any apparatus for conditioning air, and to a rectangular uniform unit duct system which does not depend upon a trunk line system of installation; the specific system of the present invention comprising thermal unit ducts of such cross-section that they have an air volume capacity of predetermined ratio to the number of thermal units delivered per minute therethrough; other aspects of the invention include a rectangular thermal unit duct having an air volume capacity equal to the heating units passing through it and directly proportional to the grate area of the hot air or other furnace with which it is used and proportional to the amount of heat absorbed by the air in a cooling system; a furnace discharge head or any apparatus for distributing hot air, cooled air, or conditioned air having a plurality of uniform standard square openings or outlets in said discharge head to receive uniform standard square ducts therein; fittings and clamping means for the square ducts; together with other considerations, accessory parts, and assembling devices; all of which are hereinafter described and claimed.

In the prior art, hot air furnace installations have been provided with either of two types of distributing systems. One of these is the so-called trunk line system, tailormade for the particular installation, each duct and branch and return being especially designed for a certain capacity, velocity, and resistance, the entire system being individually constructed from working drawings, with consequent added expense to the home owner or builder. In such trunk line systems, the air leaves the furnace all in one large duct which branches at the proper points to distribute the air where required. The other prior art system is known as the "leader pipes" installation, where round pipes are used. These round pipes or "leader" pipes take off separately and individually from the bonnet of the furnace casing. Such round pipes occupy a large amount of head room, do not lend themselves to compactness in making turns or connections, and are unpleasant and unattractive to the eye.

The thermal unit system of the present invention replaces both of these prior art systems. The present invention obviates all the disadvantages of prior round duct systems. It also overcomes the additional installation cost of trunk line over round ducts, and yet retains the advantages of an individually designed trunk line system; all at a low cost, together with the added advantages of saving of head room, simplicity of assembly, standardization of sizes and parts at the factory, and what is more important, maximum and proper heat carrying capacity with highest efficiency, and the elimination of guess work and speculation on the part of the craftsman making the installation.

I have discovered that square thermal unit ducts can be used and maximum efficiency of heat distribution is obtainable with a predetermined velocity of air through the ducts in accordance with their heat carrying capacity and that such heat carrying capacity in B. t. u. per minute should be substantially equal to the air volume capacity in cubic feet per minute and be directly proportional to the grate area of the furnace.

For better understanding of the invention, reference is made to the accompanying figures, of which Figure 1 is a chart showing the relationship I have found existing between the heating capacity of a series of furnaces of various sizes in relation to their grate areas;

Figure 2 is a plan view of the discharge end of a hot air furnace showing square openings or outlets therein for reception of square duct fittings.

Figure 3 is a view in elevation of a right angle elbow of square cross-sectional area.

Figure 4 is a view in elevation of a 45° elbow of square cross-sectional area.

Figure 5 is a plan view of a right angle connection or boot for floor register.

Figure 6 is a front view of the boot shown in Figure 5.

Figure 7 is a top view of a modified form of boot.

Figure 8 is an elevation of the boot shown in Figure 7.

Figure 9 is a plan view of a boot for wall stack connection.

Figure 10 is an elevation of the boot shown in Figure 9.

Figure 11 is a plan view of a modified form of boot for wall stack connection.

Figure 12 is an elevation of the boot shown in Figure 11.

Figure 1:
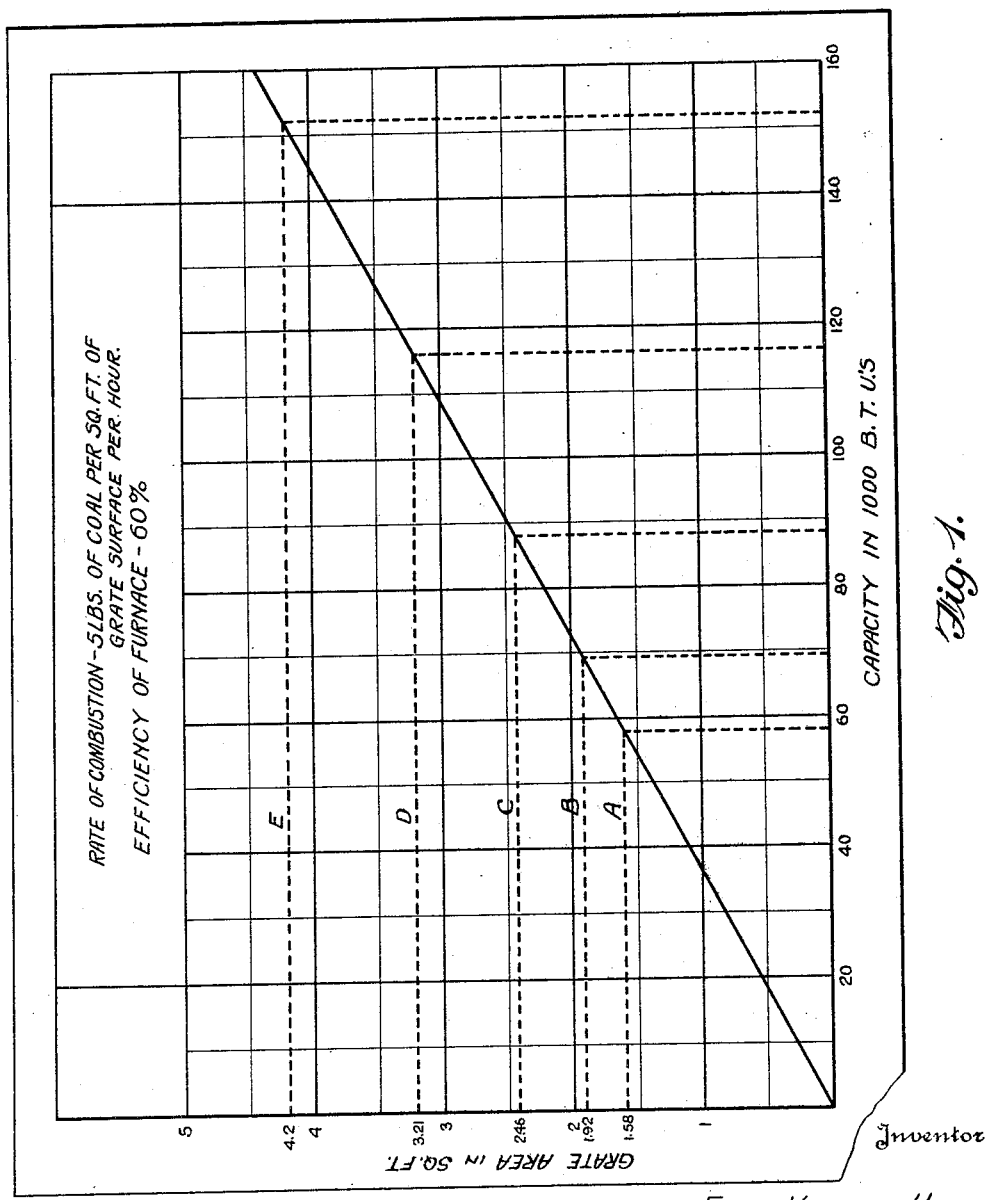
Figures 13, 14, 15, 16:
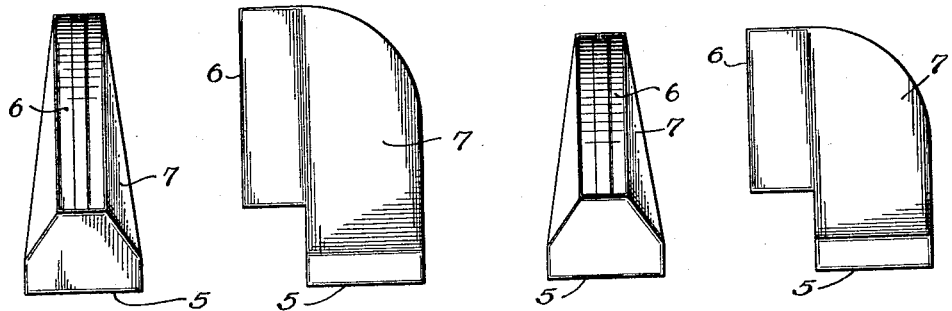
Figure 13 is a plan view of another boot for wall stack connection.
Figure 14 is an elevation of the fitting in Figure 13.
Figure 15 is a plan view of a modified form of the boot for wall stack connection shown in Figure 13.
Figure 16 is an elevation of the fitting of Figure 15.

Referring to Figure 1, it will be seen that the ordinate is the grate area of various hot air furnaces numbered respectively A, B, C, D, and E, while the abscissa is the B. t. u. capacity based upon a furnace efficiency of 60% and a combustion rate of 5 pounds of coal per square foot of grate surface per hour. If "*l*" represents the amount of coal burned in pounds per square foot of grate surface per hour, "*r*" the B. t. u. value per pound of the coal, "*a*" the grate area in square feet, and "*x*" the furnace efficiency, then "K", the furnace capacity in B. t. u. per minute is found from the formula $$K=\frac{lrxa}{60}.$$

I have discovered that square ducts of unit and uniform size can be successfully used in a hot air furnace home installation if each unit duct delivers one B. t. u. per minute for each cubic foot of air carried and discharged through the duct per minute. I have further discovered that a preferred air velocity of 600 feet per minute in a unit duct carrying 200 cubic feet of air per minute satisfies the above conditions, delivers 200 B. t. u. per minute. Knowing the heating capacity of the furnace in B. t. u. from the formula $$K=\frac{lrxa}{60},$$

and since the bonnet temperature of the air leaving the furnace is 125° and the return air to the furnace is 70°, a difference of 55 Fahrenheit degrees, equivalent to 1 B. t. u. per cubic foot of air, $\frac{K}{200}$ gives the maximum number of ducts from the discharge head of the furnace.

It will be observed that the heat capacity of the furnace in B. t. u. per minute will be the value identical with the air capacity of the same, and that the number of leader pipes or the number of rooms served can be easily and readily obtained, as shown by the following table:

| Furnace no. | K=heating capacity in B.t.u. per minute | Air capacity in cu. ft. per minute | $\frac{K}{200}$=average no. of ducts |
|---|---|---|---|
| A | 1,000 | 1,000 | 5 |
| B | 1,250 | 1,250 | 6¼ |
| C | 1,500 | 1,500 | 7½ |
| D | 2,000 | 2,000 | 10 |
| E | 2,500 | 2,500 | 12½ |

A square unit duct carrying 200 cu. ft. of air per minute at a velocity of 600 feet per minute will have a free internal area of ⅓ square foot, with dimensions approximating 7 inches by 7 inches.

A velocity of 600 feet per minute is preferred, but it need not be slavishly followed. For example, a velocity of 1000 feet per minute can be used without noise and excessive resistance, but this higher velocity reduces gravity to a negligible amount. I may also go lower and have a velocity of 500 feet per minute, but 600 is best.

Referring to Figure 2 of the drawings, it will be seen that the hot air furnace casing 1 has a number of beveled sides 2 which define the flat top plate 3 having a plurality of square openings 4 therein at the periphery or margin of the top plate 3. It will be understood that the number of square openings shown are merely illustrative and may be more than 8 openings, the number preferred for furnaces A and B of the grate area of Figure 1; furnaces C and D of Figure 1 take 12 openings, while furnace E takes 16 openings. However, it will be undestood that the openings in respective furnaces, while varying in number, are all identical in size and take the same size unitary duct; in other words, the size of furnace discharge openings and discharge ducts are standard and uniform for all size furnaces, and the same size duct and opening is found at the tops of furnaces A and E, although these furnaces vary in capacity.

Figure 20:
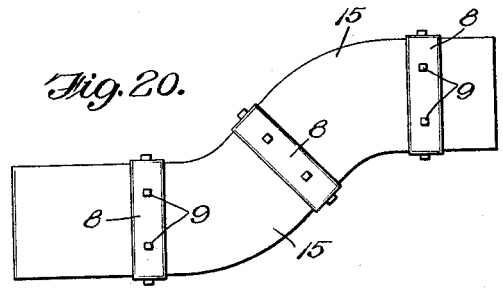
Figure 20 is an elevation view of a short offset.
Figure 21:
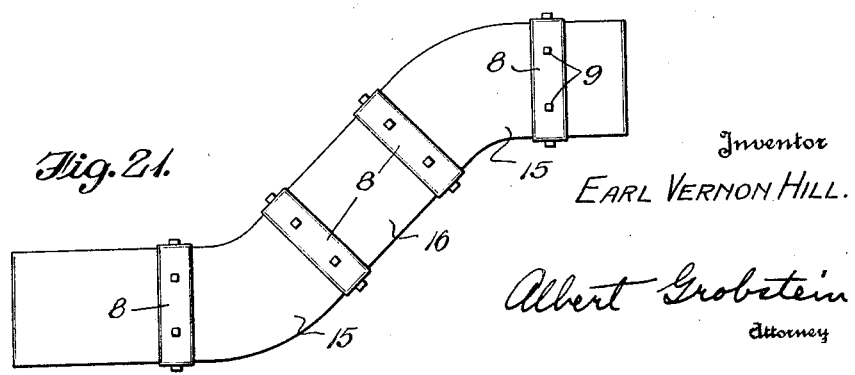
Figure 21 is a view in elevation of a long offset.

Installation of the standardized square duct system is preferably made in parallel lines and right angle turns, and only in cases of extreme necessity using anything but a right turn. Occasionally this will be impossible and the 45° elbow shown in Figure 4 is provided, but this 45° elbow is used principally in making offsets in the line, as shown in Figures 20 and 21. Two 45° elbows reversed with a connecting piece of duct gives any offset required.

In the standard top 3 of the furnace shown in Figure 2, having a standard number of outlets 4, a short run of square duct goes directly upward to the ceiling elbow and all ducts are on the same plane below the floor joists. All runs are preferably parallel or at right angles with the floor joists except in occasional instances where obstructions necessitate offsets, in which case two 45° elbows are joined to obtain the desired offset.

The right angle connection or boot for connection to floor registers as shown in Figures 5 and 6 comprises a square end 5 communicating with an enlarged outlet 6 by the angular inclined portion 7. The fittings shown in Figures 7 and 8 are modifications of the fitting of Figure 5 and are intended to make proper connections to other types of floor registers.

The fittings shown in Figures 9, 10, 11 and 12 are adapted to make connections with wall stacks of rectangular cross-section, as shown in my co-pending application bearing Serial Number 601,635, filed March 28, 1932.

The fittings shown in Figures 13, 14, 15 and 16 are for wall stack connection where the fittings shown in Figures 9 and 12 are inadaptable. It will be observed that the outlet openings 6 in the boots of Figures 9 to 16 are of comparatively narrow rectangular cross-section, in order that they may correspond to the stack sections running through the house walls, which walls ordinarily are not of a size sufficient to permit the furnace duct to run therethrough. These fittings are square at the inlet 5 to correspond to the furnace discharge line and rectangular at outlet 6 to correspond to the wall stack, with the tapering sides 7 therebetween.

Figure 17:
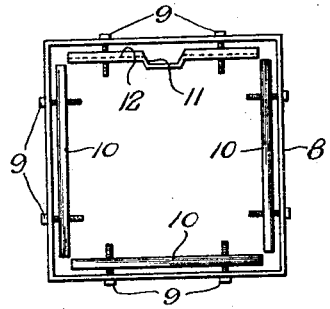
Figure 17 is a view showing the connecting clamp in elevation.
Figure 19:
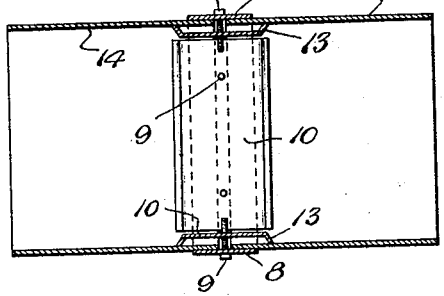
Figure 19 is a view in section of square ducts joined together with the connecting clamp of Figure 17.
Figure 18:
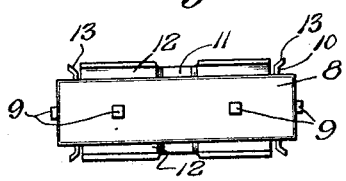
Figure 18 is a plan view of the connecting clamp of Figure 17.

Referring to Figures 17, 18 and 19, a preferred embodiment of my novel clamp means is shown, together with the method in which the square ducts are connected. The clamp proper comprises a relatively inexpensive rectangular stamping having a plurality of apertures therein to receive the screws 9 which have engagement with the inner binding members 10. One of the inner binding members is preferably made of the configuration shown in Figure 17 with a groove or recessed portion 11 and a base portion 12 in order that a pipe seam or joint may be accommodated. It will be observed that the inner binding members 10 are of trapezoidal cross-section with inclined sides 13 to exert a grip or spring effect on the pipes to be connected when pressure is applied to the members 10 through the medium of the binding screws 9. In making the connection shown in Figure 19, each end of the square ducts 14 is shoved into the clamp 8 as far as it will go and the screws 9 on the four sides tightened, thereby drawing the inner members 10 firmly against the inside of the ducts, binding them securely and making a tight and rigid connection.

Figures 20 and 21 show the preferred method of making offsets in the duct line. The member 15 of Figure 4, which is a 45° elbow of rectangular cross-section, is used with an intermediate straight member 16 in making a long offset as shown in Figure 21, while in making a short offset, the elbows are merely placed together in reversed position.

It will be seen that I have provided a furnace or air conditioning duct system which requires merely a pair of snips to cut the standard pipes to proper length and a wrench for tightening the connecting clamps. Not only are the ducts standardized size, but velocity in the ducts as well as their heat-carrying capacity is standardized so that calculations are simplified for installing heating and/or cooling systems. In mechanical refrigeration systems for homes, a temperature drop of from 77.5° to 50° in the washer will give a cooling capacity of one-half the heating capacity and each standard duct will have 100 B. t. u. of cooling capacity.

It will be seen that my square duct thermal unit system can be used in home air heating and cooling systems with advantage, as fan circulation particularly permits the proper amount of heat and the proper quantity of air to flow through the duct for a room of average size. The fittings, as hereindescribed, are of immense advantage over the trunk line fittings of the prior art, not only in simplicity of construction and installation, but in adaptability also. For example, the elbows of square cross-section can be turned in various directions. Cold air return lines should preferably be omitted, but if used, may be fabricated to the size required depending upon the size of the cold air registers. Dampers, or preferably adjusting registers, may be used in balancing and adjusting the system. A damper may be used in each unit duct in the basement, if desired.

It will be understood that my thermal unit system is applicable to the installation of air conditioning equipment on steam and hot water jobs as well as on warm air furnaces. When my thermal unit system is used with an air conditioner in conjunction with a hot water heating plant, the conditioning apparatus is placed in the basement adjacent the hot water boiler, and thermal unit ducts are vertically disposed upwardly from the air conditioner. The top of the air conditioner is provided with a discharge end having square openings or outlets therein for reception of square duct fittings, similar to the discharge end of the warm air furnace shown in Figure 2.

I claim:

1. A warm air furnace having a top with a plurality of uniform square shaped openings therein, and uniform distributing ducts in said openings of corresponding shape, said furnace generating an amount of heat per minute as determined from the formula $$K=\frac{lrxa}{60},$$

in which $l$ is the coal burned in pounds per square foot of grate surface per hour, $r$ is the B. t. u. value of the coal, $a$ is the grate area of the furnace in square feet, and $x$ is the furnace efficiency, the maximum number of said ducts being determined by the formula $\frac{K}{200}$.

2. In a warm air furnace, a top having a plurality of square openings of uniform size on said top and adapted to receive vertical square ducts therein, said openings being located about the marginal edge of said top and arranged to permit the ducts to be separated from one another.

3. A standard warm air furnace installation comprising a furnace, a top therefor having a plurality of square openings adjacent the margin thereof, and a plurality of ducts of square cross-section fitting in said openings, all of said ducts being of uniform size and each of said ducts having a capacity of carrying one B. t. u. per minute per cubic foot of air passing therethrough at a velocity of 600 feet per minute.

4. A top for a warm air furnace having a square horizontal portion, and square openings in the horizontal portion adjacent to and having their sides parallel to the edges of said horizontal portion.

In testimony whereof I hereunto set my hand.

EARL VERNON HILL.